US 8,849,785 B1

(12) United States Patent
Shattuck

(10) Patent No.: US 8,849,785 B1
(45) Date of Patent: Sep. 30, 2014

(54) SEARCH QUERY REFORMULATION USING RESULT TERM OCCURRENCE COUNT

(75) Inventor: Scott Hamilton Shattuck, Westminister, CO (US)

(73) Assignee: Google Inc., Mountain View, CA (US)

( * ) Notice: Subject to any disclaimer, the term of this patent is extended or adjusted under 35 U.S.C. 154(b) by 448 days.

(21) Appl. No.: 12/688,006

(22) Filed: Jan. 15, 2010

(51) Int. Cl.
  *G06F 7/00* (2006.01)
  *G06F 17/30* (2006.01)
  *G06Q 30/02* (2012.01)

(52) U.S. Cl.
  CPC .......... *G06F 17/30864* (2013.01); *G06Q 30/02* (2013.01)
  USPC ....................................................... 707/706

(58) Field of Classification Search
  CPC .................... G06F 17/30864; G06F 17/30867; G06F 17/30637; G06Q 30/02; G06Q 30/0241
  See application file for complete search history.

(56) References Cited

U.S. PATENT DOCUMENTS

| | | | |
|---|---|---|---|
| 5,544,281 A | 8/1996 | Maruoka et al. | |
| 5,563,960 A | 10/1996 | Shapiro | |
| 5,745,392 A | 4/1998 | Ergas et al. | |
| 5,748,851 A | 5/1998 | Iokibe et al. | |
| 5,841,890 A | 11/1998 | Krase | |
| 5,952,957 A | 9/1999 | Szu | |
| 5,987,457 A * | 11/1999 | Ballard | 1/1 |
| 6,006,225 A * | 12/1999 | Bowman et al. | 1/1 |
| 6,212,524 B1 | 4/2001 | Weissman et al. | |
| 6,236,684 B1 | 5/2001 | Wu | |
| 6,240,409 B1 | 5/2001 | Aiken | |
| 6,353,825 B1 * | 3/2002 | Ponte | 1/1 |
| 6,356,899 B1 * | 3/2002 | Chakrabarti et al. | 707/737 |
| 6,460,029 B1 | 10/2002 | Fries et al. | |
| 6,463,426 B1 | 10/2002 | Lipson et al. | |
| 6,484,162 B1 | 11/2002 | Edlund et al. | |
| 6,516,312 B1 * | 2/2003 | Kraft et al. | 707/610 |
| 6,532,307 B1 | 3/2003 | Sato | |
| 6,701,309 B1 | 3/2004 | Beeferman et al. | |
| 6,701,310 B1 * | 3/2004 | Sugiura et al. | 1/1 |
| 6,760,724 B1 | 7/2004 | Chakrabarti et al. | |
| 7,200,584 B2 | 4/2007 | Sakurai | |
| 7,292,634 B2 | 11/2007 | Yamamoto et al. | |
| 7,296,011 B2 | 11/2007 | Chaudhuri et al. | |
| 7,296,014 B1 | 11/2007 | Gilbert et al. | |

(Continued)

OTHER PUBLICATIONS

Narrative Information Disclosure Statement (1 page) and screen shots showing highlighting a phrase from a first web page, "right clicking" to display a dialog box, and selecting a search option, which returns a second web page of search results for the highlighted phrase (2 pages). Jun. 27, 2008.

(Continued)

*Primary Examiner* — Anteneh Girma
*Assistant Examiner* — Jessica N Le
(74) *Attorney, Agent, or Firm* — Fish & Richardson P.C.

(57) ABSTRACT

Methods, systems, and apparatus, including computer programs encoded on a computer storage medium, for processing voice commands. In one aspect, a method includes obtaining an occurrence count for terms that occur in resources that a search engine has identified as being responsive to an original search query, identifying a term that occurs in the resources, based on the occurrence count, providing the term and a control for display on a client device, the control being associated with the term and with promotion or demotion criteria, receiving a signal indicating that the user has selected the control, and automatically reformulating the original search query based on the term and the promotion or demotion criteria.

22 Claims, 7 Drawing Sheets

(56) References Cited

U.S. PATENT DOCUMENTS

| | | | |
|---|---|---|---|
| 7,356,171 | B2 | 4/2008 | Werthiem et al. |
| 7,571,162 | B2 | 8/2009 | Sun et al. |
| 7,580,813 | B2 | 8/2009 | Thiesson et al. |
| 7,752,557 | B2 | 7/2010 | Hoeber et al. |
| 7,756,855 | B2 * | 7/2010 | Ismalon .................... 707/713 |
| 7,792,769 | B2 | 9/2010 | Kant et al. |
| 7,840,579 | B2 | 11/2010 | Samuelson et al. |
| 7,885,911 | B2 | 2/2011 | Cormode et al. |
| 7,912,823 | B2 | 3/2011 | Ferrari et al. |
| 7,962,504 | B1 | 6/2011 | Mehanna |
| 8,005,813 | B2 | 8/2011 | Chowdhury et al. |
| 8,019,742 | B1 | 9/2011 | Baluja et al. |
| 8,024,337 | B1 | 9/2011 | Baluja et al. |
| 8,386,454 | B2 | 2/2013 | Haas et al. |
| 8,515,935 | B1 | 8/2013 | Baluja et al. |
| 2001/0047355 | A1 | 11/2001 | Anwar |
| 2002/0019763 | A1 | 2/2002 | Linden et al. |
| 2002/0194166 | A1 * | 12/2002 | Fowler ........................ 707/3 |
| 2003/0088554 | A1 * | 5/2003 | Ryan et al. ................... 707/3 |
| 2003/0110163 | A1 | 6/2003 | Chen et al. |
| 2003/0172063 | A1 * | 9/2003 | Gutta et al. .................. 707/5 |
| 2003/0212760 | A1 | 11/2003 | Chen et al. |
| 2004/0254920 | A1 | 12/2004 | Brill et al. |
| 2005/0102259 | A1 | 5/2005 | Kapur |
| 2005/0161542 | A1 | 7/2005 | Theut |
| 2006/0010126 | A1 | 1/2006 | Anick et al. |
| 2006/0026152 | A1 * | 2/2006 | Zeng et al. .................. 707/5 |
| 2006/0104484 | A1 | 5/2006 | Bolle et al. |
| 2006/0110043 | A1 | 5/2006 | Reissman |
| 2006/0112085 | A1 * | 5/2006 | Zijlstra et al. ............... 707/3 |
| 2006/0195443 | A1 | 8/2006 | Franklin et al. |
| 2006/0277210 | A1 | 12/2006 | Starbuck |
| 2007/0050351 | A1 | 3/2007 | Kasperski et al. |
| 2007/0162422 | A1 | 7/2007 | Djabarov |
| 2007/0239713 | A1 | 10/2007 | Leblang et al. |
| 2007/0260635 | A1 * | 11/2007 | Ramer et al. ............. 707/104.1 |
| 2007/0271255 | A1 * | 11/2007 | Pappo ....................... 707/5 |
| 2008/0027918 | A1 * | 1/2008 | Altevogt et al. .............. 707/3 |
| 2008/0147638 | A1 * | 6/2008 | Hoeber et al. ............... 707/5 |
| 2008/0288489 | A1 * | 11/2008 | Kim ......................... 707/6 |
| 2009/0144262 | A1 * | 6/2009 | White et al. ................. 707/5 |
| 2009/0193352 | A1 * | 7/2009 | Bunn ....................... 715/780 |
| 2009/0248397 | A1 | 10/2009 | Garcia et al. |
| 2009/0287680 | A1 * | 11/2009 | Paek et al. .................. 707/5 |
| 2010/0104158 | A1 | 4/2010 | Shechtman et al. |
| 2010/0106703 | A1 * | 4/2010 | Cramer ..................... 707/706 |
| 2010/0131484 | A1 * | 5/2010 | Gosse et al. ................ 707/706 |
| 2010/0138400 | A1 * | 6/2010 | Curtis et al. ............... 707/706 |
| 2010/0145678 | A1 * | 6/2010 | Csomai et al. ................ 704/9 |
| 2010/0145940 | A1 * | 6/2010 | Chen et al. ................. 707/736 |
| 2010/0169300 | A1 * | 7/2010 | Liu et al. .................... 707/709 |
| 2010/0205172 | A1 * | 8/2010 | Luk ......................... 707/715 |
| 2010/0287149 | A1 * | 11/2010 | Joshi ....................... 707/706 |
| 2010/0287175 | A1 | 11/2010 | Beaudreau et al. |
| 2011/0047136 | A1 | 2/2011 | Dehn |
| 2011/0252030 | A1 * | 10/2011 | Spangler ..................... 707/729 |
| 2012/0066216 | A1 * | 3/2012 | Alexander ................... 707/723 |

OTHER PUBLICATIONS

Silla, Jr., Carlos, N., et al., "An Analysis of Sentence Boundary Detection Systems for English and Portuguese Documents," Proceedings of 5th International Conference CICLing 2004, Seoul, Korea, Feb. 15-21, 2004, pp. 135-141.

Schneider, G., "A low-complexity, broad-coverage probabilistic Dependency Parser for English," Proceeding of HLT-NAACL 2003, Student Research Workshop, pp. 31-36, Edmonton, Canada, May-Jun. 2003.

Chien et al., Semantic Similarity Between Search Engine Queries Using Temporal Correlation, May 10-14, 2005, ACM, www 2005; proceedings of the 14$^{th}$ international conference on world wide web, pp. 2-11.

Li et al, A Survey on Wavelet Applications in Data Mining, Dec. 2002, ACM SIGKDD Explorations NewsLetter, vol. 4, Issue 2, pp. 49-68.

Das et al., Google News Personalization: Scalable Online Collaborative Filtering, May 8-12, 2007, ACM—www 07—Proceedings of the 16$^{th}$ international conference on world wide web, pp. 271-280.

Chakrabarti et al., Approximate query processing using wavelets, Sep. 2001, Springer-Veriag New York, vol. 10, Issues 2-2, pp. 199-223.

"Low-Support, High Correlation, Finding Rare but Similar Items Minhashing Locality-Sensitive Hashing, 43 pages."

Jacobs, Charles E. et al., "Fast Multiresolution Image Querying," Department of Computer Science and Engineering, University of Washington, 10 pages.

Stollnitz et al., "Wavelets for Computer Graphics: A Primer, Part 1," IEEE Computer Graphics and Applications, 15(3):76-84, May 1995, pp. 1-8.

Stollnitz et al., "Wavelets for Computer Graphics: A Primer, Part 2," IEEE Computer Graphics and Applications, 15(4):75-85, Jul. 1995, pp. 1-9.

Office Action issued in U.S. Appl. No. 13/219,076 on Nov. 10, 2011, 45 pages.

Office Action issued in U.S. Appl. No. 13/219,076 on Jun. 28, 2012, 57 pages.

Office Action issued in U.S. Appl. No. 12/163,925 on Jun. 15, 2011, 16 pages.

Office Action issued in U.S. Appl. No. 12/163,925 on Mar. 15, 2012, 16 pages.

Office Action issued in U.S. Appl. No. 12/163,925 on Dec. 19, 2012, 25 pages.

Office Action issued in U.S. Appl. No. 12/710,012 on Feb. 16, 2012, 16 pages.

Office Action issued in U.S. Appl. No. 12/710,012 on Jul. 2, 2012, 14 pages.

Chan et al., "Efficient time series matching by wavelets," ICDE, 1999, p. 126-133.

Garofalakis et al., "Wavelet synopses with error guarantee," Proceedings of 2002 ACM SIGMOD, Madison, Wisconsin, USA, Jun. 2002, ACM Press, pp. 476-487.

Gilbert et al., "Surfing wavelets on streams: One-pass summaries for approximate aggregate queries," The VLDB Journal, 2001, p. 79-88.

Jacobs et al., "Fast multiresolution image querying," Computer Graphics, 29(Annual Conference Series):277-286, 1995.

Matias et al., "Dynamic maintenance of wavelet-based histograms," VLDB '00, Morgan Kaufmann, 2000, 101-110.

Matias et al., "Wavelet-based histograms for selectivity estimation," ACM SIGMOD, 1998, p. 448-459, ACM Press.

Roerdink et al., "Wavelet-based Volume Visualization," Nieuw Archief voor Wiskunde, 1999, 17(2):149-158.

Shahabi et al., "2d TSAtree: A wavelet-based approach to improve the efficiency of multi-level spatial data mining," Statistical and Scientific Database Management, 2001, p. 59-68.

Shahabi et al., "TSA-tree: A Wavelet-based approach to improve the efficiency of multi-level surprise and trend queries on time-series data," Statistical and Scientific Database Management, 2000, p. 55-68.

Vlachos et al., "Identification of similarities, periodicities and bursts for online sesarch queries," In Int. Conf. Mgmt. Data (SIGMOD), 2004, 12 pages.

Vitter et al., "Approximate computation of multidimensional aggregates of sparse data using wavelets," SIGMOD, 1999, p. 193-204.

Vitter et al., "Data cube approximation and histograms via wavelets," Proc. of the 7th Intl. Conf. on Information and Knowledge Management, 1998, 96-104.

Wu et al., "A comparison of DFT and DWT based similarity search time-series databases," CIKM, 2000, p. 488-495.

Zhai et al., "A study on web-log using wavelet," Research and Development Information Retrieval, 2001, 1-34.

Office Action issued in U.S. Appl. No. 12/710,012 on Apr. 5, 2013, 23 pages.

Office Action Issued in U.S. Appl. No. 13/615,793 on Apr. 26, 2013, 23 pages.

Office Action Issued in U.S. Appl. No. 13/616,893 on Oct. 3, 2013, 32 pages.

(56) References Cited

OTHER PUBLICATIONS

Office Action issued in U.S. Appl. No. 12/710,012 on Apr. 5, 2013, 27 pages.
Office Action Issued in U.S. Appl. No. 12/710,012 on Oct. 2, 2013, 27 pages.
Office Action Issued in U.S. Appl. No. 13/615,793 on Nov. 8, 2013, 18 pages.
Office Action issued in U.S. Appl. No. 12/163,925 on Jan. 6, 2014, 25 pages.
Notice of Allowance issued in U.S. Appl. No. 13/616,893 on Jan. 8, 2014, 10 pages.
Office Action Issued in U.S. Appl. No. 11/756,127 on Sep. 16, 2009, 29 pages.
Office Action Issued in U.S. Appl. No. 11/756,127 on Jun. 9, 2010, 48 pages.
Notice of Allowance Issued in U.S. Appl. No. 11/756,127 on Jan. 6, 2011, 13 pages.
Notice of Allowance Issued in U.S. Appl. No. 11/756,127 on May 6, 2011, 9 pages.
Notice of Allowance received in U.S. Appl. No. 13/219,076 on May 15, 2013, 14 pages.

* cited by examiner

SEARCH QUERY REFORMULATION USING RESULT TERM OCCURRENCE COUNT

BACKGROUND

This specification generally relates to search engines.

While search engine results often get users 'into the ballpark,' it is increasingly common for users to have to reformulate their queries to locate a desired web resource. Today, this successive query reformulation process is manual, increasing the overall time required for a user to reach the desired search result One way to attempt to reduce this amount of time is to work on improving initial result sets, using what might be called the 'perfect search engine' hypothesis. Under this hypothesis, with sufficient contextual information about the user, the perfect search engine should be able to perfectly derive the user's intent and to locate a desired web resource based on the user's input query.

Practically speaking, however, to succeed under this hypothesis, the user's original search query would have to be highly disambiguated by query content and/or by extensive knowledge of the user. The average user, however, is unlikely to enter such highly disambiguated original queries, and is also unlikely to be comfortable with the level of history collection necessary to clearly disambiguate results. In the future, the phrasing of original queries is likely to remain terse and simplistic, providing just enough information to obtain a broad result set that requires iterative reformulation for final success.

SUMMARY

According to one innovative aspect of the subject matter described in this specification, rank-ordered terms are displayed with search results on a search engine results page, for the disambiguation or reformulation of an original search query. The terms, which may be displayed using a checklist or other interface element, are automatically derived from the resources identified in the results of the original search query, and are not necessarily derived from the language of the original search query itself. The terms are rank-ordered by their frequency of occurrence within the resources, or by their word distribution or occurrence frequency relative to certain other web content or to a particular language as a whole. Controls that are displayed adjacent to the rank-ordered terms on the search engine results page allow a user to promote, demote, add or remove a particular term from the results of a successive, automatically reformulated query.

The automatic reformulating of queries using these identified terms eliminates the need for a user to provide manual reformulations. Thus the user avoids a manual, iterative reformulation process, where the user must switch to an advanced search mode, individually decide on disambiguation terms, and then manually add the disambiguation terms to their queries using possibly unfamiliar Boolean syntax and quoting rules. Further, the enhanced search query reformulation process leverages search engine result data analysis to identify terms without requiring any personal information or user history. Accordingly, the user is presented with an intuitive, point-and-click interface to quickly and easily reformulate or retarget their successive search engine queries, reducing the overall time that it takes a user to locate usable results.

In general, another innovative aspect of the subject matter described in this specification may be embodied in methods that include the actions of obtaining an occurrence count for terms that occur in resources that a search engine has identified as being responsive to an original search query, identifying a term that occurs in the resources, based on the occurrence count, providing the term and a control for display on a client device, the control being associated with the term and with promotion or demotion criteria, receiving a signal indicating that the user has selected the control, and automatically reformulating the original search query based on the term and the promotion or demotion criteria. Other embodiments of this aspect include corresponding systems, apparatus, and computer programs, configured to perform the actions of the methods, encoded on computer storage devices.

These and other embodiments may each optionally include one or more of the following features. For instance, identifying the term may include identifying a term that occurs frequently in the resources, based on the occurrence count, identifying a term that occurs frequently in the resources, based on the occurrence count, and that is not a stop word, identifying a term that occurs more than a predetermined quantity of times in the resources, or one of an N most frequently occurring terms in the resource, N being any positive integer. The occurrence count may be obtained by the search engine after executing the original search query, or by the client device after identifying the resources that satisfy the original search query. The actions may also include receiving a signal indicating that the user has selected a reformulation control for reformulating the original search query, where the term may be identified responsive to receiving the signal indicating that the user has selected the reformulation control.

In further examples, obtaining the occurrence count for the terms that occur in the resources may further include counting the terms that occur in the resources and that are not stop words, or selecting all resources that satisfy the search query, a top N ranked resources satisfy the original search query, N being a positive integer, or the resources that satisfy the original search query and that are currently identified on a user interface of the client device, and counting the terms that occur in the selected resources. The actions may include updating a global occurrence count for the terms that occur in all resources of a particular language indexed by a search engine, using the occurrence count. The actions may include determining a frequency in which the identified term occurs in the resources that satisfy the original search query, based on the occurrence count, and determining a frequency in which the identified term occurs in the resources of a particular language that have been indexed by a search engine.

In additional examples, the actions may include displaying the term, the control, and information identifying both the frequency in which the identified term occurs in the resources that satisfy the original search query, and the frequency in which the identified term occurs in the resources of the particular language that have been indexed by the search engine. The actions may also include determining a degree to which the frequency in which the identified term occurs in the resources that satisfy the original search query deviates from the frequency in which the identified term occurs in the resources of the particular language that have been indexed by the search engine, and ranking the identified terms based on the degree to which the frequency in which the term occurs in the resources that satisfy the original search query deviates from the frequency that the term occurs in the resources of the particular language that have been indexed by the search engine.

In further examples, the occurrence count may count a number of times that a term that is used by any of the resources occurs in all of the resources. The promotion criteria may specify that resources referenced by search results for the reformulated search query that include the term are to be promoted, or that the resources referenced by the search results for the reformulated search query are required to include the term. The demotion criteria may specify that resources referenced by search results for the reformulated search query that include the term are to be demoted, or that the resources referenced by the search results for the reformulated search query are required to not include the term. Automatically reformulating the search query may further include automatically adding the term to the original search query, the term being subject to an inclusion or exclusion operator. The control may be a checkbox, a button, or a hyperlink.

In additional examples, the actions may include displaying, on a user interface of a client device, an exclude control to require that resources referenced by search results for the reformulated search query do not include the term, a demote control to specify that the resources referenced by the search results for the reformulated search query that include the term are to be demoted, a promote control to specify that the resources referenced by the search results for the formulated search query that include the term are to be promoted, and a require control to require that the resources referenced by the search results for the reformulated search query include the term. Identifying a term that occurs frequently in the resources may further include identifying a term that occurs more than a predetermined number of times in the resources, or that is one of an N most frequently occurring terms in the resources, N being any positive integer.

The details of one or more embodiments of the subject matter described in this specification are set forth in the accompanying drawings and the description below. Other potential features, aspects, and advantages of the subject matter will become apparent from the description, the drawings, and the claims.

DETAILED DESCRIPTION

Figure 1:
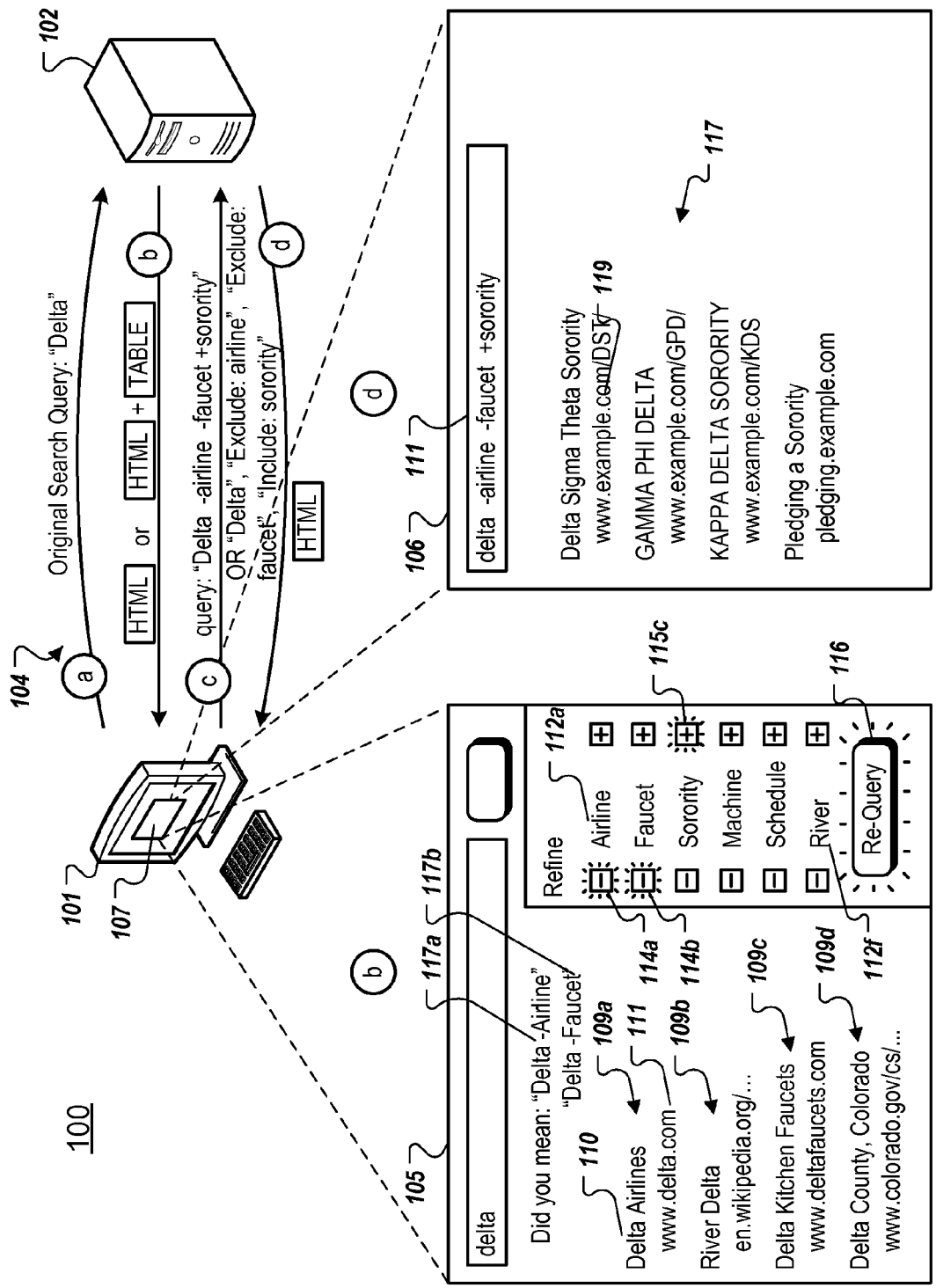
FIG. 1 is a diagram demonstrating search reformulation using a result term occurrence count.

FIG. 1 is a diagram demonstrating the reformulation of a search query using a result term occurrence count. In particular, the diagram illustrates a system 100 that includes a client device 101 and a search engine 102, and illustrates both the flow of data 104 between the client device 101 and the search engine 102 during time-sequenced states "A" to "D," as well as the user interfaces 105 and 106 that are displayed on the client device 101 during states "B" and "D," respectively.

As used by this specification, a "search query" includes the one or more query terms that the user submits to a search engine when the user requests the search engine to execute a search. Among other things, a "result" of the search includes a Uniform Resource Locator (URL) that references a resource which the search engine determines to the be responsive to the query. The result may include other things, such as a snippet of text from corresponding resource.

In this illustration, the user of the client device 101 is attempting to locate a website for the sorority "Delta Sigma Theta," and does so by initiating a search dialogue on the client device 101. Once a search box 107 is displayed on the user interface of the client device 101, the user enters the query term "delta" into the search box 107, and selects a control on the user interface to initiate the "original" search query. As used by this specification, the term "original" is merely intended to distinguish this search query from "successive" search queries, and is not intended to require this search query to be the first search query initiated by the user. For instance, the original search query may be a second or an Nth search query initiated by the user to locate an particular website, where N can be any positive integer, or the original search query may represent a query that has already been automatically reformulated.

Responsive to the selection of this control, and as shown in state "A," the client device 101 transmits an original search query, which, in this case, is the single term "delta," to the search engine 102 for execution. The search engine 102 executes a search on the original search query and identifies, in the results of the search on the original search query, resources that include the user-entered query term "delta," or that otherwise satisfy this original search query. The resources that satisfy the original search query may be, for example, web pages that the search engine 102 has indexed after a previous crawl of a network.

In addition to the "Delta Sigma Theta" sorority, the term "delta" is also associated with several other popular subjects, including "Delta Airlines," "River Delta," "Delta Kitchen Faucets," and "Delta County, Colorado." As such, the results of the original search query may reference a mix of "intended" resources that the user intends to locate, and "unintended" resources that the user does not intend to locate. For example, the results may reference intended resources, such as a website for the "Delta Sigma Theta" sorority or a Wikipedia entry about the "Delta Sigma Theta" sorority, as well as one or more unintended resources, such as a corporate website or product review site for "Delta Airlines" or "Delta Faucets."

When searching for the website associated with the "Delta Sigma Theta" sorority, the user may have been unaware of the existence of these other popular subjects (e.g., "Delta Airlines," or "Delta Faucets,"), when they entered the query term "delta" into the search box 107. Alternatively, the user may have been aware of these other popular subjects but, under the "perfect search engine" hypothesis, might have expected that the search engine 102 would rank the intended resources higher than the unintended resources. For instance, the user of the client device 101 might assume that the search engine 102 would use the user's search history or user profile information to promote the intended resources over the unintended resources. If the client device 101 has a small keyboard or other input mechanism that makes it difficult to enter multiple query terms or long query terms, the user may be more likely to enter fewer or shorter query terms on the chance that the additional input might turn out to be unnecessary.

In the illustrated example, the search engine 102 either does not have, or does not utilize, the user's search history or user profile information to disambiguate the intended resources from the unintended resources. Alternatively, the user's search history or user profile information may be insufficient to properly disambiguate the results of the original search query. The search engine ranks the results of the original search query so that the unintended resources are ranked highly, but does not identify or highly rank the intended resources. In state "B", the search engine 102 generates a hypertext markup language (HTML) file (or other type of file) that includes the uniform resource locators (URLs) and other information associated with the results of the original search query, and transmits this file to the client device 101.

The client device 101 or the search engine 102 may generate an occurrence count for terms that occur in the resources which satisfy the original search query. The terms that occur in these resources are referred to by this specification as "result terms." The occurrence count can be generated before, during, or after the execution of the original search query. The occurrence count specifies a number of times that a term that is used by any of the resources which satisfy the original search query occurs in all of the resources in the returned result set. Alternatively, the occurrence count specifies a number of times that a term that is used by any of some subset of the resources which satisfy the original search query occurs in all of the resources of the subset. The subset may include first few identified resources in the returned result set, a particular subset of the resources that have been identified by the search engine, or on the resources referenced by search results that are visible on a user interface of the client device at a given time. Because each result may include a snippet of the text included in a resource as well as a link to the actual resource, the occurrence count may be performed on using the snippet, or using the entire text of the resource itself. The process of obtaining or generating an occurrence count may also be referred to as "performing an occurrence count."

An occurrence count may be generated by identifying resources, such as the first N resources that the search engine determines best satisfy an original search query or a successive search query, identifying each term that occurs in the resources, and then counting the number of times that each identified term occurs in the resources. The occurrence count may be stored as a hash table (or other data structure) associated with the resources. This process may be performed by the client device 101 or the search engine 102 after the execution of the original search query.

Alternatively, the occurrence count may be generated by identifying each term that occurs in a particular resource, counting the number of times that each term occurs in the particular resource, storing that count information as a hash table for the particular resource. When a set of resources that a search engine identifies includes the particular resource, the hash tables (or individual count information) associated with each resource of the set is aggregated to generate an occurrence count for the set. The first portion of this process may be performed by the search engine 102 while indexing resources on a web, while the second portion of this process may be performed by the client device 101 or the search engine 102 after the execution of the original search query.

Where both of the two above example processes for obtaining an occurrence count refer to counting the terms that occur in resources, the counted terms may include all or some of the terms that occur in all or some of the resources. For instance, "filtered" terms or stop words that are unlikely to assist in disambiguating unintended resources from intended resources, including the terms "www," "and," "the," or any other term, may not be counted, or may be counted but not included in the occurrence count or any rank-ordered list of terms. Similarly, the terms of certain resources, including low-ranking, duplicate, spammy, user-selected, or other resources, may not be counted.

The occurrence count may be generated by the search engine 102 before sending the HTML file (or other type of file) to the client device 101, where identified terms are ranked by the search engine 102 based on the occurrence count and are included in ranked order in the HTML file. Alternatively, the results of the original search query may be sent in an HTML file to the client device 101, while the occurrence count or a ranked list of terms may be sent as a separate table to the client device 101 for ranking.

The occurrence count may identify one or more terms and the corresponding number of times that each term occurs in the resources. Alternatively, the occurrence count may be a ranked list of the frequently occurring terms without any raw count data. A term that occurs frequently in the resources may be, for example, a term that occurs more than a predetermined number of times, a top Nth ranking term within the resources (again, N being any positive integer, and being the same value as or a different than any other N mentioned in this specification), or a term in the top Nth percentile of the result terms.

The occurrence count may instead be, or may also be, generated by the client device 101 after obtaining the results of the original search query. For instance, the client device may generate the occurrence count upon receiving the HTML file from the search engine 102, or upon detecting that the user would like to reformulate the original search query. Additional detailed examples of generating an occurrence count by a client device or by a search engine are described below, with reference to FIGS. 6 and 7, respectively.

The user interface 105, which is displayed by the client device 101 during state "B," includes entries 109*a* to 109*d* that identify resources for "Delta Airlines," "River Delta," "Delta Kitchen Faucets," and "Delta County, Colorado," respectively. Each entry includes textual information associated with the corresponding resource (e.g., "Delta Airlines" text 110), and a link to a URL for the corresponding resource (e.g., "www.delta.com" link 111). The user interface 105 also includes information which identifies one or more terms that occur in the resources (e.g., "airline" text 112*a* to "river" text 112*f*), and one or more controls (e.g., controls 114, 115) associated with each term. The terms 112 may be ranked-ordered based on the number of times that each term is mentioned in the resources, based on the number of times that each term occurs in the resources of a particular language that have been indexed by the search engine (obtained from a "global occurrence count" table), or based on how frequently the terms occur in the resources (referred to as the "occurrence frequency in the resources") relative to how frequently the terms typically occur in a particular language (referred to as the "global occurrence frequency").

Notably, the rank-ordered terms are identified based on the resources that are identified in results of the original search query (i.e., by generating an occurrence count on terms that occur in the text of the resources identified by the results, or in a snippet of text associated with each resource in the results), and are not simply "related query" or "did you mean?" suggestions that are based on past related searches from other users. Said another way, the rank-ordered terms are derived from an analysis of the results of the original search query, and are not necessarily derived from an analysis of the query terms of the original search query. Correlating word distribution statistics against the general statistics for the user's language or against general web content, rank-ordered terms may assist the user in selecting a reformulated search query.

By basing the content of user interface 105 on the resources that the search engine has located with the original search query, the enhanced search query reformulation approach illustrated in FIG. 1 closely models, but improves upon, the approach that users manually perform. For instance, when faced with search results that reference resources that do not satisfy the user's need for information, a user may scan the text of a few pages of search results, identify which terms are most prevalent, and use those terms to help them reformulate an original search query. By moving that content processing to the client device 101 or the search engine 102, search query reformulation can be done efficiently using statistical models of the user's language and web content. This creates an opportunity to have the most impact on improving subsequent query results and the overall user experience in terms of the time required to locate useable results.

The controls associated with a term may include "exclude" controls, "demote" controls, "promote" controls, "require" controls, "quote" controls, Boolean operator controls, or other controls. "Exclude" controls, such as exclude controls 114a and 114b associated with identified terms "airline" and "faucet," respectively, operate to exclude the associated term from the results of a reformulated search query. "Require" controls, such as require control 115c associated with the identified term "sorority," operate to require the associated term from the results of a reformulated search query. An "open" control may include a text entry field to allow a user to type in a term that is not automatically identified, to be excluded, demoted, promoted, or required.

Other controls, such as a "demote" control that demotes (but does not necessarily exclude) the term in the results of the reformulated search query, or a "promote" control that promotes (but does not necessarily require) the term in the results of the reformulated search query, may also be provided on the user interface 105. Furthermore, a "quote" control requires that two or more identified terms appear together in a particular sequence in the results of the reformulated search query. The search engine may promote or demote particular results by altering the weights or relevance scores associated with the resources, so that they appear more relevant or less relevant in the among the results of a reformulated search query.

Generally, the exclude controls and the demote controls allow the user to input demotion criteria for a particular identified term, while the require and promote controls allow the user to input promotion criteria for a particular identified term. The user interface 105 also includes a "re-query" control 116 to initiate the automatic reformulation of the original search query, and the execution of the reformulated query by the search engine 102. The controls may be implemented by a portion of the code that is received in the HTML file from the search engine 102, or the controls may be generated by the client device 101 without the involvement of the search engine 102. Instead of the exemplary controls depicted in FIG. 1, the controls 114 and 115 may be check-boxes, slider bars, other types of buttons, or hyperlinks, such as links included in a tag cloud. As referred to by this specification, a "tag cloud" is a visual depiction of tags, or hyperlinks, which are used to link to the content of web sites. Tags may be single words and may be typically listed alphabetically, and the importance of a tag may be shown with font size or color.

In addition to or instead of soliciting input from the user by way of the controls 114 and 115 before generating a reformulated search query, the client device 101 or the search engine 102 may also generate suggested reformulated search queries. The links 117 that identify these suggested reformulated search queries may be displayed with the results of the original search query. For instance, the search engine may determine that the three most frequently occurring terms in the original search results (or in the top three search results) include three different terms, and, upon determining that these three terms relate to different subject matter, may generate three reformulated search queries which each demote or promote one of these terms, to allow the user to disambiguate the results of a successive search query. Alternatively, the search engine may generate suggested reformulated search queries based on the lack of a user selection on a search result of the original search query.

When selected by the user of the client device 101, the links 117a and 117b transmit a request to the search engine 102 to execute reformulated search queries that demote the terms "airline" or "faucet," respectively, from the results of the reformulated search query. Reformulated search queries may also be automatically generated and suggested when the user selects a "suggest reformulated search query" control.

Regardless of whether the occurrence count is obtained at the client device 101 or the search engine 102, the user interface 105 establishes that the terms "airline," "faucet" "sorority," "machine" "schedule" and "river" occurred frequently within the resources identified in the original search results. As noted above, other terms that might occur frequently in the resources but that might not be helpful in disambiguating search results, such as articles ("the," "a," "an"), conjunctions ("and," "but," etc.), prepositions ("on," "beneath," "athwart"), or other terms (e.g., ubiquitous terms such as "www," or spammy terms) may be stored as filtered terms (or stop words) in a database, and may either be excluded from the occurrence count, or may not identified as a frequently occurring term regardless of their occurrence count. Thus, the identified terms may be those terms that occur most frequently in the identified resources, and that are not otherwise filtered.

The occurrence count may be generated using all of the resources identified in the original search engine results, or using some subset of the resources these results identify. For instance, the client device 101 may generate the occurrence count on the first few identified resources only, on a particular subset of the resources that have been identified by the search engine 102, or on the resources referenced by search results that are visible on a user interface of the client device 101 at a given time ("the visible resources"). In the FIG. 1 example, the occurrence count occurred using more than just the resources identified by search results in a first page of search results, since the term "sorority" is identified, although none of the search results appear to be related to a sorority.

The controls that are displayed adjacent to the rank-ordered terms on the search engine results page allow a user to promote, demote, add or remove a particular term from reformulated search query results. For instance, the user selects one or more of the controls 114 to 117, then initiates the automatic reformulation of the original search query. In the depicted example, since the user is interested in the "Delta Sigma Theta" sorority and not "Delta Airlines" or "Delta Faucets," the user has selected control 114a (associated with "exclude" and "airline"), control 114b (associated with "exclude" and "faucet"), control 115c (associated with "require" and "sorority"), then re-query control 116. The client device 101 detects that the controls 114a, 114b, 115c, and 116 have been selected, and transmits a signal to the search engine 102.

A reformulated search query is automatically generated by the client device 101 or the search engine 102, based on the identified term and the promotion or demotion criteria. When the client device 101 generates the reformulated search query, the client device transmits this reformulated search query (e.g., in state "C," "{query: delta−airline−faucet+sorority}") to the search engine 102. When the search engine 102 generates the reformulated search query, the client device transmits information identifying the query terms of the original search query, information identifying the identified terms selected by the user, and information identifying the promotion or demotion criteria associated with each term (e.g., in state "C," {"delta," "Exclude: airline," "Exclude: faucet," "Include: Sorority"}).

Using the information selected by the user, the client device 101 or the search engine 102 may reformulate the original search query by adding the identified query terms to the original search query, the added query terms being subject to an inclusion or exclusion operator (e.g., "+" or a "−" character or quotation marks). Other reformulation approaches are also possible, such as by adding Boolean operators to the original search query. Where different search engines use different inclusion or exclusion operators to promote or demote certain terms, those operators are substituted for the "+" and "−" characters.

In state "D," in response to executing the reformulated search, the search engine 102 generates the results of the reformulated search query, and transmits these results in an HTML file to the client device 101. The client device 101 invokes the code included in the HTML file to generate the user interface 106, which includes information 117 identifying the results of the reformulated search query. In this example, however, the intended resource 119 has been identified in the results of the reformulated search query based on the previously input promotion and demotion criteria. The process of reformulating the search query may end in state "D," or the process may iteratively continue by obtaining an occurrence count for the resources identified by the results of the reformulated search query and by specifying promotion or demotion criteria for frequently occurring terms.

Figure 2:
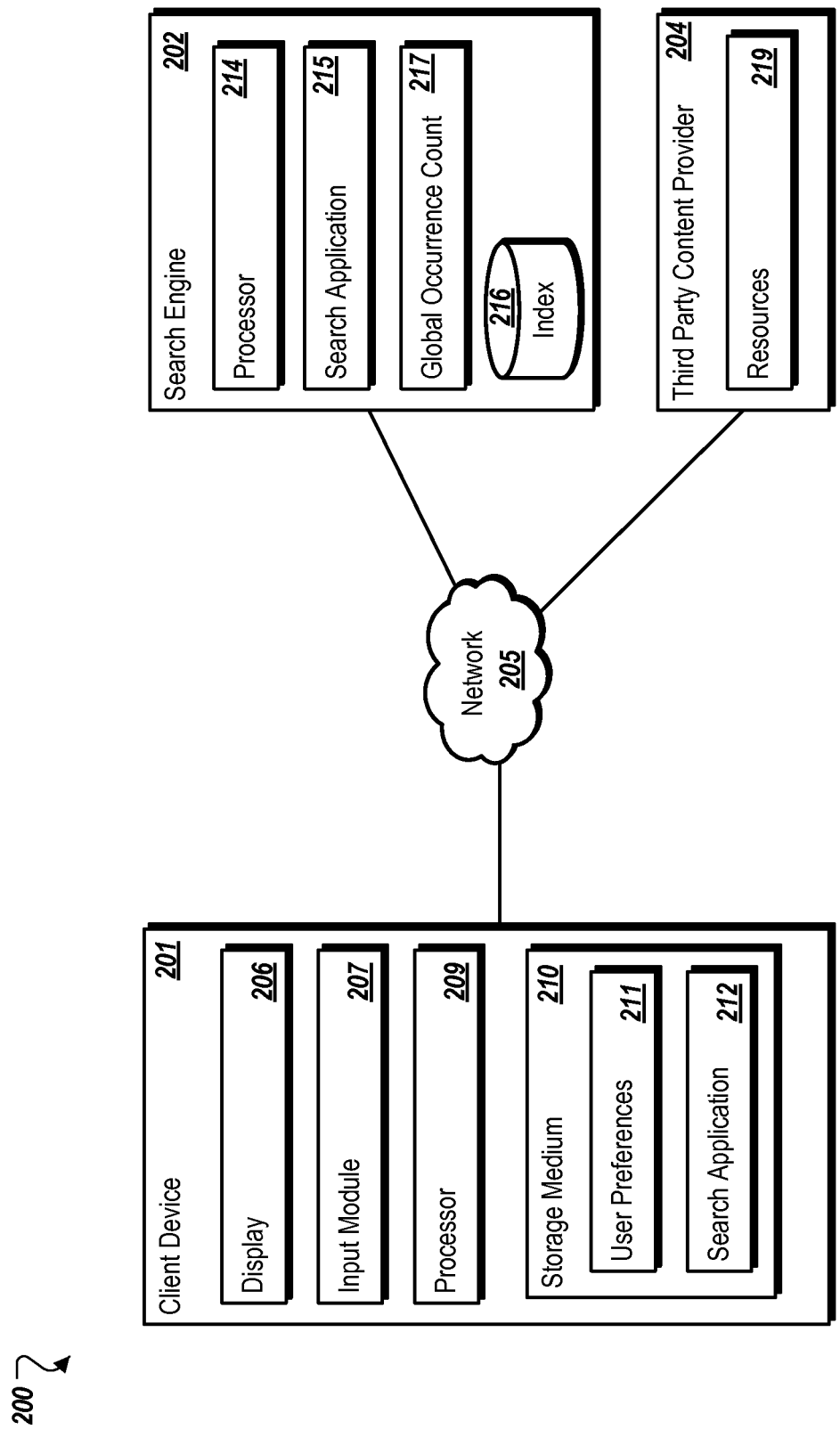
FIG. 2 is a diagram of an exemplary system.

FIG. 2 is a block diagrams of an exemplary system 200 that includes a client device 201, a search engine 202, and a third party content provider 204, connected by way of a network 205. The network may be any public or private computer network, such as the Internet. The client device 201, which may perform some or all of the functionalities associated with client device 101, may be any type of computing device or system that includes one or more processors 209, including a server, a laptop or desktop computer, a mobile telephone, a personal digital assistant (PDA), or an embedded system. The client device 101 includes a display 206 for outputting the text and/or graphics that make up the various user interfaces used for performing searches and search query reformulations, and an input module 207 (e.g., a touch screen, a mouse, a microphone, or a keyboard) for receiving user inputs. Among the many items and applications that may be stored on the storage medium 210, the client device 201 stores user preferences or search histories 211, as well as a search application that invokes part or all of the searching or search query reformulation functionality described by this specification.

The search engine 202, which may perform some or all of the functionalities associated with the search engine 102, may also be any type of computing device or system that includes one or more processors 214. In one example, the search engine 202 is the Google search engine. In addition to the processors 214, the search engine 202 includes a search application 215 that, among other things, invokes part or all of the searching or search query reformulation functionality described by this specification, a global occurrence count 217, that is a table or database which specifies the number of times that the terms that occur in all or some of the resources of a particular language that have been indexed by the search engine.

The values stored in the global occurrence count 217 differ the global occurrence frequency, which specifies how frequently a term occurs in the resources of a particular language that have been indexed by the search engine 202. For instance, if the global occurrence count 217 stores one million terms for a particular language, and a particular term has been counted five hundred times in all of the resources that have been indexed by the search engine 202, the value stored in the global occurrence count 217 for that term is "five hundred," while the global occurrence frequency of that particular term is five hundred out of a million, or one in two thousand (expressed as "1:2000"). The search engine 202 also includes an index 216 of the resources that have been visited or crawled by the search engine 202. The resources that are indexed by the search engine 202 may include the resources 219 that are hosted by the third party content provider 204, which have been discovered by the search engine 202 during a previous crawl of the network 205.

In some example implementations, the functionalities illustrated in association with the client device 201, the search engine 202, and the third party content provider 204 may actually be performed by different components of the system 200. For instance, the client device 201 may maintain part or all of the global occurrence count 217 and may store the resources 219. Similarly, the search engine 202 may store part or all of the user preferences or the search history 211.

Additionally, although the client device 201, search engine 202 and third party content provider 204 are all illustrated as being in operable communication with each other over the network 205, in other exemplary implementations certain components of the system 200 may not be in operable communication with other components. For instance, the client device 201 and the search engine 202 may communicate with each other over a first portion of the network 205, and the search engine 202 may communicate with the third party content provider 204 over a second portion of the network 205, but the client device 201 and the third party content provider 204 may not be able to directly communicate with each other.

Figure 3:
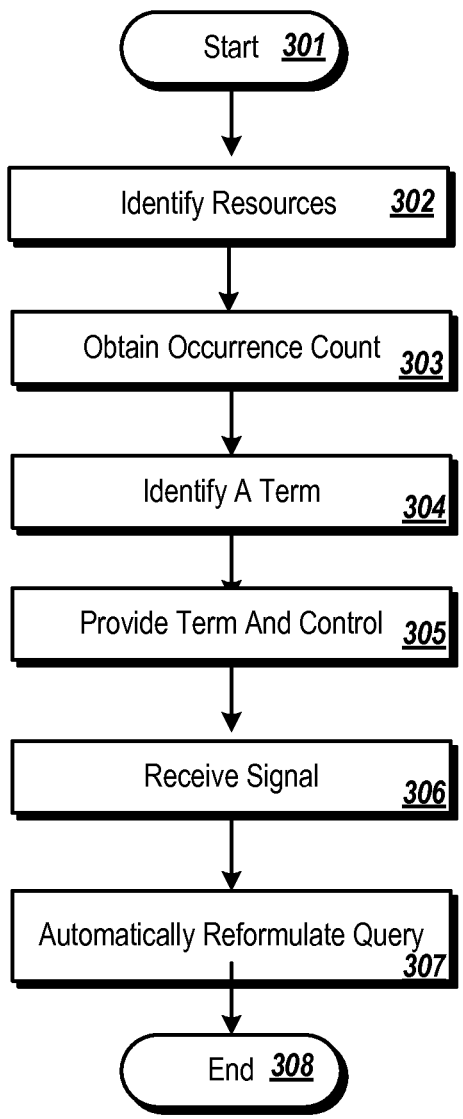
FIG. 3. is a flowchart of an exemplary process.

FIG. 3 is a flowchart of an exemplary process 300 for performing search query reformulation using a result term occurrence count. Briefly, the process 300 includes the actions of identifying resources that satisfy an original search query; obtaining an occurrence count for terms that occur in the resources; identifying a term that occurs frequently in the resources, based on the occurrence count; providing the term and a control for display on a client device, the control being associated with the term and with promotion or demotion criteria; receiving a signal indicating that the user has selected the control; and automatically reformulating the original search query based on the term and the promotion or demotion criteria.

When the process 300 begins (301), resources that satisfy an original search query are identified (302). For instance, a user may initiate the execution of an original search query by invoking a search dialogue (e.g., visiting "www.google.com," or invoking a persistent toolbar with a search box) on a client device, entering query terms into a search box, and selecting a control to instruct a search engine to execute the original search query. A search application on the client device or search engine identifies resources that satisfy the original search query, and provides links to the identified resources as part of the results of the original search query. The identified resources may include resources that the search engine has previously crawled and indexed.

An occurrence count is obtained (303) for terms that occur in one or more of these resources. An occurrence count may be generated by identifying resources, such as the resources that satisfy an original search query or a successive search query, identifying each term that occurs in the resources, and then counting the number of times that each identified term occurs in the resources. For example, a web page whose content includes the words "Hello World, Hello!" may be associated with an occurrence count that tracks result term counts, such as {Hello: 2, World: 1}. This process may be performed by the client device or the search engine after the execution of the original search query.

Alternatively, the occurrence count may be generated by identifying each term that occurs in a particular resource, counting the number of times that each term occurs in the particular resource, storing that count information as a hash table (or other data structure) for the particular resource, then identifying a set of resources that includes the particular resource, and aggregating the hash tables (or individual count information) associated with each resource of the set to generate an occurrence count for the set.

An occurrence count may be generated for the terms of an individual resource by a search engine, for example when the search engine crawls resources during an indexing process or when the search engine identifies certain resources as a result of the original search query. When resources are identified in the results of the original search query, an occurrence count can be generated for the identified resources by combining the count information for each individual resource. For example, if a search engine identifies a set of web pages as satisfying an original query term, then the word distribution statistics for the web pages that make up the set is obtained and merged, and the top-ranking terms would be identified to the user on a search results page. As discussed more fully below, identified terms may be used to help reformulate a successive search query, based on user-specified promotion or demotion criteria.

The occurrence count may also be generated by a client device, for example when the resources are identified in the results of the original search query. The client device may obtain an occurrence count for the resources by iteratively generating count information for each individual resource, and by combining the count information to generate an occurrence count for the identified resources as a whole. Exemplary processes for obtaining an occurrence count at a client device or a search engine are described below with respect to FIGS. 6 and 7, respectively.

The occurrence count specifies a number of times that a term that is used by any (or some subset) of the resources identified in the search engine results, occurs in all (or some other subset) of the resources. The client device or the search engine may identify to the user those terms that occur frequently (e.g., the top few most frequently used terms) in the resources and that are not included in the database of filtered terms (or stop words).

The occurrence count may be generated based on determining that the user has selected a control for reformulating the original search query, such as where the user selects an "advanced search" or "query reformulation" control on a user interface. The occurrence count may instead be generated automatically, without requiring the user to select a control to seek assistance with reformulating the original search query. Alternatively, the user may set preferences that identify the circumstances when query reformulation assistance should be provided automatically, and when it should not be provided until a control is selected.

The occurrence count may count the terms in all or fewer than all of the resources that satisfy the original search query. For instance, the occurrence count may occur on a top N ranked resources that satisfy the original search query, or on the visible resources. Alternatively, where the search engine identifies several resources to the client device but the client device displays fewer than all of these resources, the occurrence count may be generated for one or more of the resources identified by the search engine, or one or more of the resource displayed by the client device.

Where the client device or the search engine maintain a global occurrence count for the terms that occur in all resources of a particular language, the global occurrence count may be updated based on the occurrence count. The global occurrence count may be used to display statistics adjacent to an identified term, or to rank popular terms. The occurrence count may also be used to update statistics for the that resource's language, across all indexed resources for that language.

Using the above "Hello World, Hello!" example, the global occurrence count for the term "Hello" across all English-content pages would be increased by two, while the global occurrence count for the term "World" would increase by one. Similarly, information tracking which words are often found in conjunction with others may also be updated. For example, the word correlation data for "Hello" would be updated to show that Hello was found in the presence of "World" an additional two times. While process 300 describes the various indexing, statistical analysis, and merge/sort operations as occurring in a particular order, they may occur in other orders as well, and certain operations may be entirely omitted.

The one or more terms that occur in the resources may be identified based on the occurrence count (304). The one or more terms may be terms that occur frequently in the resources. A term that occurs frequently in the resources may be, for example, a term that occurs more than a predetermined number of times, a top Nth ranking term within the resources (e.g., a top $1^{st}$ $5^{th}$ $10^{th}$, or $100^{th}$ ranking term), or a term in the top Nth percentile of the terms that occur in the resources. Terms that occur frequently but that are identified in a filtered term database may not be identified to the user.

The one or more terms and one or more controls are provided for display on a client device (305), where each control is associated with a term and with promotion or demotion criteria. The controls may include an exclude control to exclude the term from the results of the reformulated search query, a demote control to demote the term in the results of the reformulated search query, a promote control to promote the term in the results of the reformulated search query, and/or a require control to require the term in the results of the reformulated search query. The control may include an open control, which may include a text entry field, to allow a user to type in a term that is not automatically identified, to be excluded, demoted, promoted, or required. In this manner, the query refinement may occur using terms that are automatically identified, or terms that are manually added by the user.

Where the search engine identifies the terms, the client device may receive a file from the search engine, the file including a first code portion that identifies the results of the original search query, and a second code portion that implements the control. The control may be a checkbox, a button, a voice prompt, a hyperlink, or any other visual or non-visual element.

The promote control and the require control allow the user to specify promotion criteria that indicates that the identified term is to be promoted in a results of the reformulated search query, or required in the results of the reformulated search query, respectively. The demote control and the exclude control allow the user to specify demotion criteria that indicate that the identified term is to be demoted in the results of the reformulated search query, or excluded from the results of the reformulated search query, respectively.

Using the global occurrence count, the client device or the search engine may determine a frequency in which the identified terms occur in the resources that satisfy the original search query, based on the occurrence count, and may determine a frequency in which the identified terms typically occur in the resources of a particular language indexed by a search engine. For instance, it may be determined that a particular term occurs in one out of every five hundred words in the identified resources, but occurs in one out of every thousand words in the English language, representing a 100% increase in usage or occurrence in the identified resources over the term's typical usage.

The exemplary, 100% increase represents the degree to which the frequency in which the term occurs in the resources that satisfy the original search query deviates from the frequency in which the term typically occurs in the resources of the particular language. Identified terms may be ranked based on their raw occurrence count, or based on the degree to which the frequency in which the term occurs in the resources that satisfy the original search query deviates from the frequency that the term typically occurs in the resources of the particular language. Furthermore, information identifying both the frequency in which the identified terms occur in the resources that satisfy the original search query, and the frequency in which the identified terms typically occur in the resources of the particular language indexed by the search engine may be displayed on a user interface to aid the user in the query reformulation.

The degree to which a term deviates from a global occurrence frequency may correlate to the importance of that term within the identified resource. If the term is mentioned in the resources an unusually large number of times over the number of times that it might ordinarily be mentioned, there is a higher likelihood that the term is discriminatory, and would have a larger impact on the results of a successive search query.

A signal is received (306) to indicate that the user has selected a control that is associated with an identified term and with promotion or demotion criteria. The controls that are displayed adjacent to the rank-ordered terms on the search engine results page thus allow a user to promote, demote, add or remove a particular term from reformulated query results. When the user selects one or more of the controls, signal may be sent to the search engine to initiate the automatic reformulation of the original search query A reformatted query is generated (307) based on the identified term and the promotion or demotion criteria. Reformulating a search query may include automatically adding the identified query term to the original search query, the identified query term being subject to an exclusion or inclusion operator (e.g., a "+" or a "−" character or quotation marks). The reformulated search query may be automatically generated by the client device or the search engine.

The reformulated search query is executed by the search engine, which identifies a subset of the resources that satisfy the reformulated search query. The subset of the resources may include all or fewer than all of the resources that satisfy the original search query. Based on the reformulation of the original search query, however, it is expected that the results of the reformulated search query will be ranked differently than the results of the original search query, if the results themselves do not differ. The process 300 may end (308), or the result-set analysis and successive automatic reformulation may continue until the user ends the cycle.

Figure 4A:
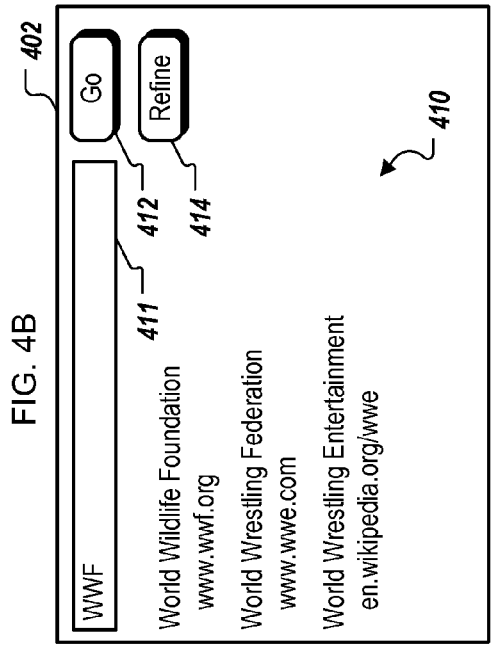
FIGS. 4A to 4D and 5 depict exemplary user interfaces.

FIGS. 4A to 4D depicts exemplary user interfaces 401 to 404, respectively. In FIG. 4A, the user interface 401 includes a search box 406 that displays a user-entered query term "delta," which was used to generate links 407 to URLs associated with original search results (e.g., resources associated with "Delta Airlines" and "River Delta"). Instead of waiting for the user to select frequently occurring terms for promotion or demotion in successive search results, suggested reformulated search queries may be generated based on the results of the original search query, and may be presented to the user as links 409 in a suggested reformulated search query region.

For instance, the search engine may determine that the three most frequently occurring terms in the original search results (or in the top three search results) include the terms "faucet," "airline," and "river," and, upon determining that these three terms relate to different subject matter, may generate the reformulated search queries "delta–faucet," "delta–airline," and "delta–river" to allow the user to disambiguate the results of a successive search query. When the user selects one of the links 409, the suggested reformulated search query associated with the selected link is sent to the search engine for execution.

Notably, the reformulated search queries associated with the links 409 are automatically generated based on the results of the original search query (i.e., by generating an occurrence count on result terms), and are not simply related query suggestions based on past related searches by other users. Put another way, the suggested reformulated query terms are derived from an analysis of the results of the original search query, and are not necessarily derived from an analysis of the query terms of the original search query.

Figure 4B:
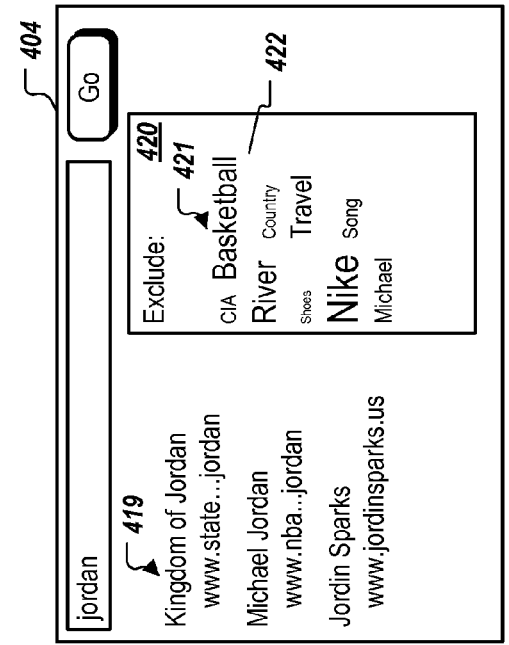

The ability to reformulate a search may always be provided to a user, may be selectively provided based on user preferences, or may be provided based on a user request. In FIG. 4B, for instance, the user has initiated a query using the query term "WWF," which is popularly associated with two very different subjects, the "World Wildlife Foundation" and the "World Wrestling Federation." The results 410 of this original search query include links to both subjects, but do not include controls to promote or demote any particular claim term in a successive search query.

If the user is seeking to locate resources about nature, they may wish to filter these results to exclude any results that relate to wrestling. To do so, the user could manually reformulate the original search query by typing additional query reformulation terms into the search box 411 (such as the term '−wrestling,' '+wildlife'" or "'world wildlife'"), and select the re-query ("Go") control 412 to initiate the execution of the manually reformulated search query. Alternatively, the user may select the "refine" control 414 to display the frequently occurring terms and associated controls to demote or promote terms in a successive search query.

The refine control 414 may be displayed adjacent to the search box 411 on a search engine home page. Clicking the refine control 414 may be an alternative to an "advanced search" option, and may open a dynamic layer or alternative page displaying the reformulation terms for user selection and a "Search again" control. An example of a dynamic layer is provided in FIG. 5.

Figure 4C:
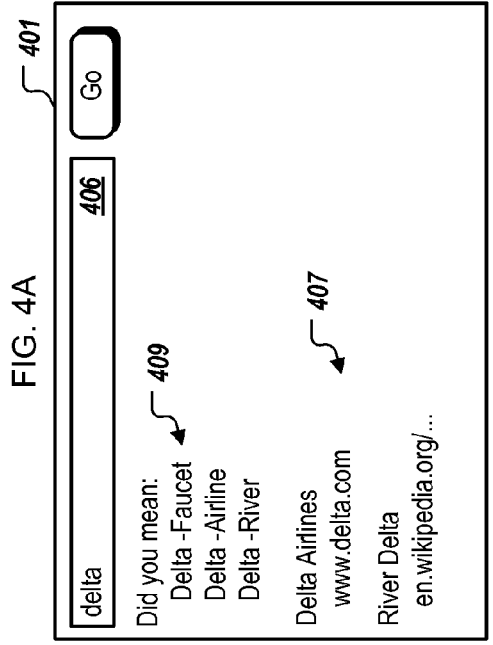

FIG. 4C illustrates a user interface 403 that includes multiple types of suggested search queries. Specifically, the user-entered query term "united" might relate to vastly different subjects, such as the Manchester United football team, the United Way charity, United Bank, United Airlines, and the United Nations. The search engine may determine, for instance, that other past users who first performed a first search query using the term "united," were more satisfied with the results of a successive search query using the terms "Manchester United," "United Bank," or "United Flight Status," and may suggest these query terms in a "Related Searches" region 415 of the user interface 403. The "Related Searches" region 415 may also be referred to as a "Did you mean?" region. These suggested query terms are based on an analysis of the language of the first query term and the habits of other users in the past, however, and not the results that identify resources responsive to the first query term.

Using the process described in FIG. 3, the search engine may also generate an occurrence count on the results of the search query that includes the query term "united" before providing these results to the client device, and may determine that the terms "Airlines" "Football" and "United Nations" frequently occur in these results. In doing so, the search engine may generate the suggested reformulated search queries "United-Airlines," "United-Football, and '"United Nations",' and may provide links or other controls to initiate search queries using these suggested reformulated search queries. In the user interface 403, for instance, links 417a to 417c which correspond to these suggested reformulated search queries are provided in a suggested reformulated search query region 416 above links to the resources included in the results of the original search query.

The suggested reformulated query terms in the search query region 416 are derived from an analysis of the results of the original search query, while the query terms in the "Related Searches" region 415 are derived from an analysis of the query terms of the original search query. When reformulated search queries are automatically suggested to a user, it may aid the user to display these suggested reformulated search queries in a region of the user interface 403 near other suggested query terms (such as near "Related Searches" region 415), so that the user knows to look to a certain portion of the user interface for query suggestions.

Figure 4D:
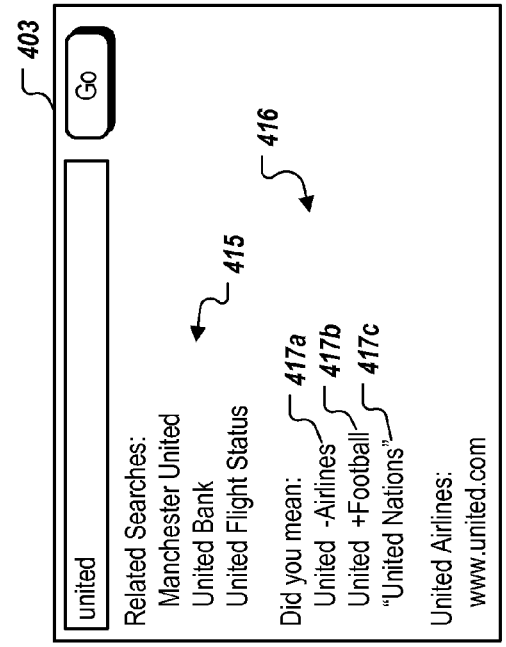

FIG. 4D illustrates a user interface 404 which uses a tag cloud to automatically generate reformulated search queries. Specifically, in response to an original search query that uses the query term "jordan," the search engine results page displayed on the user interface 404 may include links 419 to various resources that satisfy the original search query, including resources associated with the Kingdom of Jordan, Michael Jordan, and the pop singer Jordin Sparks. An exclude region 420 is defined within the user interface 404, where the exclude region 420 includes a tag cloud 421. Terms that frequently occur within the results of the original search query are displayed as links (e.g., "basketball" link 422) in the tag cloud 421, where terms that occur more frequently are displayed with a larger font than terms that occur less frequently.

Figure 5:
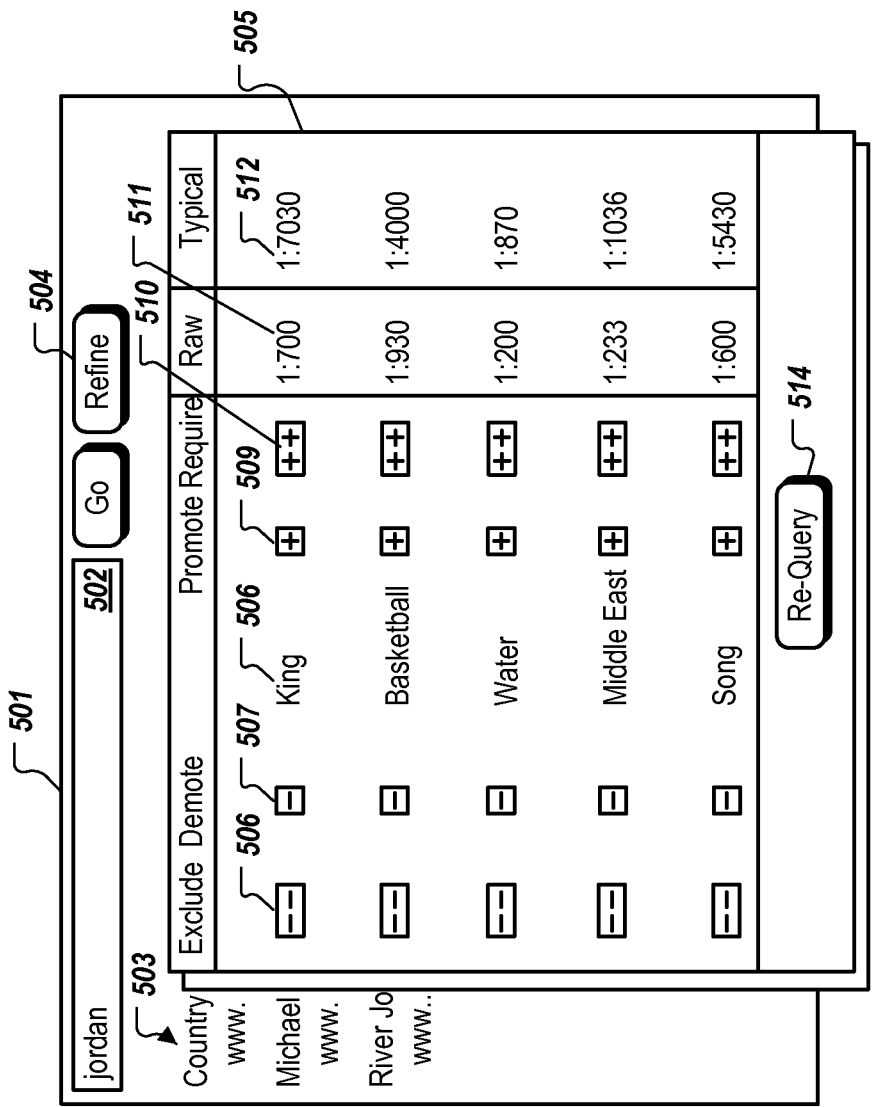

Selection of a link in the tag cloud 421 causes the client device or the search engine to automatically reformulate the original search query, based on promotion or demotion criteria associated with the region in which the tag cloud is presented. For instance, selection of the "basketball" link 422 may cause the search engine to automatically generate the reformulated search query "jordan-basketball," since the "basketball" link 422 is displayed as part of the tag cloud 421 in the exclude region 420. Instead of an "exclude" region, the user interface 404 may instead (or also) display a "require" region with a tag cloud of terms that the user intends to require in the results of a successive search query, a "promote" region with a tag cloud of terms that the user intends to promote in the results of a successive search query, and/or a "demote" region with a tag cloud of terms that the user intends to demote in the results of a successive search query FIG. 5 illustrates another user interface 501. The search box 502 indicates that an original search query was executed used the query term "Jordan." Partially obscured links 503 to the resources identified as a result of the original search query are provided below a pop-up window 505. As a result of selecting the reformulate control 504, the pop-up window 505 displays a list of terms (including "King" term 506) that frequently occur in the results of the original search query.

Various controls, including exclude control 504, demote control 507, promote control 509, and require control 510, are displayed adjacent to each corresponding term. By selecting the exclude control 506, the demote control 507, the promote control 509, or the require control 510, then the re-query control 514, the term "king" would be excluded from, or demoted, promoted or required in the results of a reformulated search query, respectively.

In addition to displaying the various controls adjacent to the corresponding terms, the pop-up window 505 also displays information 511 that specifies how frequently a corresponding term occurs in the resources identified by the results of the original search query, as well as information 512 that specifies how frequently the corresponding term typically occurs in the resources of that language that the search engine has indexed.

In FIG. 5, for instance, the information 511 specifies that the term "King" has been mentioned once per every seven hundred words in the resources identified by the results of the original search query, while the information 512 specifies that the term "King" is usually found once in every seven thousand and thirty words in the English language as a whole. Differences between these frequencies may indicate that a particular term is especially prominent in the resources identified by the results of the original search query, suggesting that it may be useful to use that term in a subsequent query reformulation. The identified terms may be ranked on the user interface 501 based on their raw frequency of occurrence, their global frequency of occurrence, the degree to which their raw frequency of occurrence deviates from that term's typical frequency of occurrence, or based on any other ranking approach.

Figure 6:
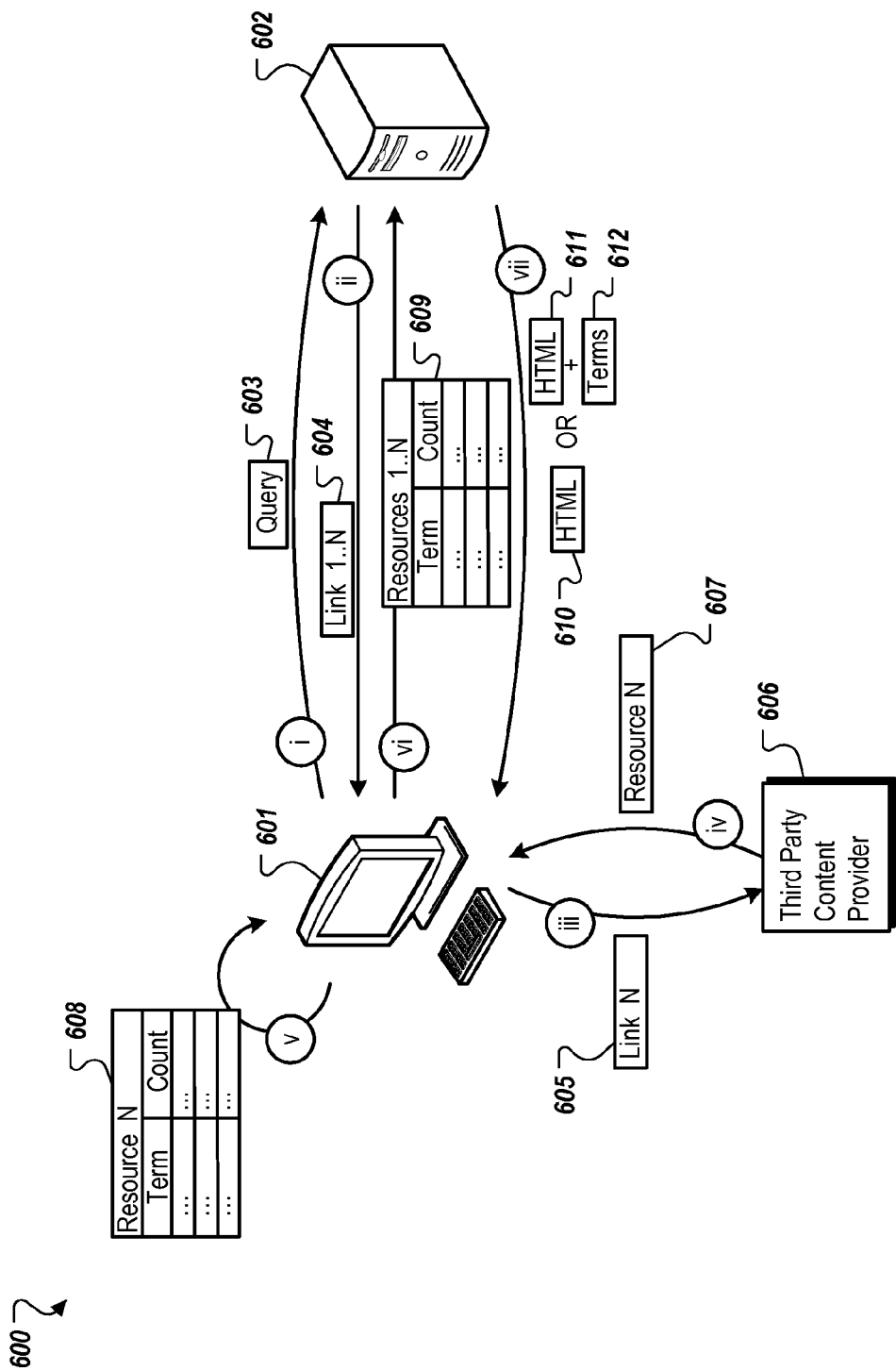
FIGS. 6 and 7 illustrate the flow of data within a system, according to two different exemplary approaches.
Like reference numbers represent corresponding parts throughout.
Figure 7:
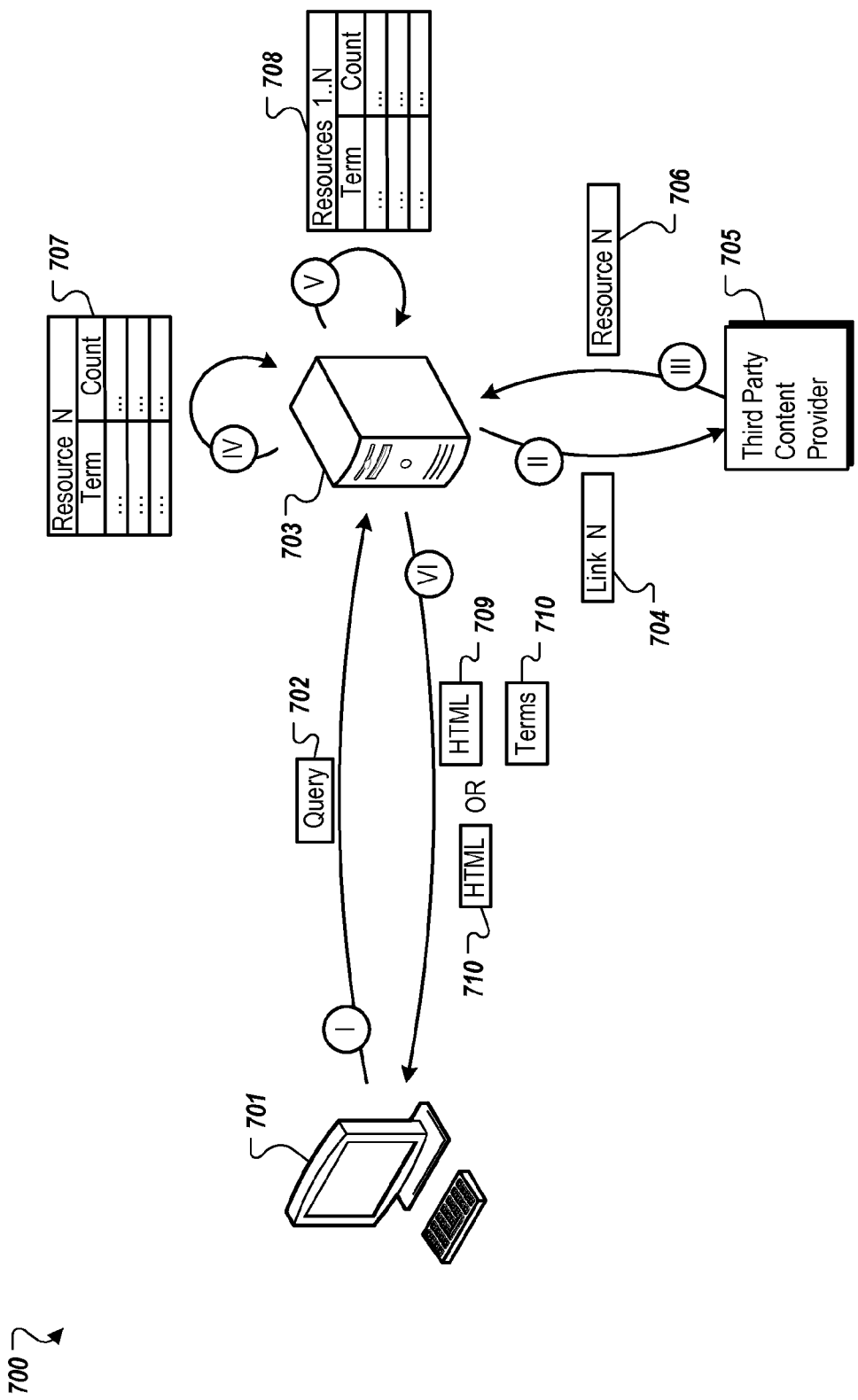

FIGS. 6 and 7 illustrate the flow of data within a system. Specifically, FIG. 6 illustrates a system in which a client device obtains an occurrence count, while FIG. 7 illustrates a system in which a search engine obtains an occurrence count.

In the system 600 of FIG. 6, a client device 601 transmits an original search query 603 to a search engine 602 during state "i." The search engine 602 identifies resources that satisfy the query 603, and responds (during state "ii") by transmitting results 604 that includes links to the identified resources, to the client device 601. The results 604 may be, for example, an HTML file that specifies the URLs of resources that satisfy the original search query 603. Instead of an HTML file, the URLs of the resources that satisfy the original search query 603 may included in another type of file, such as an XML, JSON, or plain text file.

At state "iii," the client device begins an iterative process of selecting links 605 from the results 604, and sending a request for the resource 607 associated with a link 605 to a third party content provider 606 that stores the resource 607. At state "iv," the third party content provider 607 transmits the resource 607 to the client device 601. States "iii" and "iv" iterate until the resources identified in the results 604 (or some subset of the identified resources) are obtained by the client device 601.

If a particular resource is hosted on the client device 604, states "iii" and "iv" may be skipped for that resource. If a particular resource is hosted on the search engine 602, the request is sent to the search engine 602, and the response is received from the search engine 602. If the resource is hosted on the search engine 602, the response may include the resource 607 itself, or a hash table (or other data structure) which includes term count information for that resource 607.

For each of the obtained resources, the client device 601 (at state "v") identifies the terms used in the resource, and counts the number of times each term occurs in the resource. This information may be stored in association with the resource 607 in table form (e.g., table 608). An occurrence count is generated for all of the obtained resources by combining the individual count information for each obtained resource. The occurrence count may also be stored in table form (e.g., table 609).

In state "vi," the occurrence count 609 is transmitted from the client device 601 to the search engine 602. The search engine 602 generates an HTML file 610 (or an HTML file 611 and a list of terms 612) that identifies the resources that satisfy the original search query 603 and the terms that occur frequently in the results of the original search query. The HTML files 610 or 611 include code which, when invoked by the client device 601, implements the various controls used to automatically reformulate the original search query 603. Since the occurrence count is obtained by the client device 601 and not the search engine 602, the load on the search engine 602 is reduced.

In the system 700 of FIG. 7, a client device 701 transmits an original search query 702 to a search engine 703 during state "I". The search engine 703 identifies resources that satisfy the query 703, and begins an iterative process of selecting a link 704, and sending a request for the resource 706 associated with the link 704 to the third party content provider 705 (during state "II"). At state "III," the third party content provider 706 transmits the resource 706 to the search engine 703. States "II" and "III" iterate until the all of the resources that satisfy the original search query (or some subset of the identified resources) are obtained by the search engine 703.

If a particular resource is hosted on the server 703, states "II" and "III" may be skipped for that resource. If a particular resource is hosted on the client device 701, the request is sent to the client device 701, and the response is received from the client device 701. If the resource is hosted on the client device 701, the response may include the resource 706 itself, or a hash table which includes term count information for that resource 706.

For each of the obtained resources, the search engine 703 (at state "IV") identifies the terms used in the resource, and counts the number of times each term occurs in the resource. This information may be stored in association with the resource 706 in table form (e.g., table 707). At state "V, an occurrence count is generated for all of the obtained resources by combining the individual count information for each obtained resource. The occurrence count may also be stored in table form (e.g., table 708).

The search engine 602 uses the occurrence count 708 to generate an HTML file 710 (or an HTML file 709 and a ranked list of terms 710) that identifies the resources that satisfy the original search query 702 and the frequently occurring terms. The HTML files 709 or 710 include code which, when invoked by the client device 701, implements the various controls that are used to automatically reformulate the original search query 702. Since the occurrence count is obtained by the search engine 703 and not the client device 701, the presentation of the results of the original search query and the frequently occurring terms may occur more quickly than the system 600 of FIG. 6, although the load on the search engine 703 may be greater.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   obtaining search results that are identified as responsive to an original search query;
   determining a frequency with which a particular term occurs in text associated with one or more of the search results;
   determining a frequency with which the particular term occurs in other text;
   determining that the frequency with which the particular term occurs in the text associated with the one or more search results differs, by a threshold extent, from the frequency with which the particular term occurs in the other text;
   in response to determining that the frequency with which the particular term occurs in a text associated with the one or more search results differs, by the threshold extent, from the frequency with which the term occurs in the other text, providing, for display, a representation of the particular term, a demote control to specify that the search results for the reformulated search query that include the particular term are to be demoted, and a promote control to specify that the search results for the formulated search query that include the particular term are to be promoted;
   receiving data indicative of a selection of the demote control or the promote control; and
   in response to receiving the data indicative of the selection of the demote control or the promote control, reformulating the original search query to promote or demote the particular term.

2. The method of claim 1, wherein determining a frequency with which a particular term occurs in the text associated with the one or more of the search results comprises determining the frequency of the particular term based on an occurrence count.

3. The method of claim 1, wherein determining a frequency with which a particular term occurs in the text associated with the one or more of the search results comprises determining the frequency of the particular term based on an occurrence count, and the particular term not being a stop word.

4. The method of claim 1, wherein determining a frequency with which a particular term occurs in the text associated with the one or more of the search results comprises determining that the particular term occurs in the text more than a predetermined quantity of times.

5. The method of claim 1, wherein determining frequency with which a particular term occurs in the text associated with the one or more of the search results comprises determining that the particular term is one of an N most frequently occurring terms, N being a positive integer.

6. The method of claim 1, wherein the frequency with which a particular term occurs in the text associated with one or more of the search results is obtained by the search engine after executing the original search query.

7. The method of claim 1, wherein the frequency with which a particular term occurs in the text associated with one or more of the search results is obtained by a client device after identifying the search results that satisfy the original search query.

8. The method of claim 2, wherein obtaining the occurrence count further comprises:
selecting all search results that satisfy the search query, a top N ranked search results that satisfy the original search query, N being a positive integer,
counting the terms that occur in the selected search results.

9. The method of claim 1, further comprising:
updating a global frequency for the terms that occur in all search results of a particular language indexed by a search engine.

10. The method of claim 1, further comprising:
displaying the particular term, the promote control, the demote control, and information identifying both the frequency in which the particular term occurs in the search results, and the frequency in which the particular term occurs in the search results of the particular language.

11. The method of claim 1, wherein the promotion criteria specifies that search results for the reformulated search query that include the particular term are to be promoted, or that the search results for the reformulated search query are required to include the particular term.

12. The method of claim 1, wherein the demotion criteria specifies that search results for the reformulated search query that include the particular term are to be demoted, or that the search results for the reformulated search query are required to not include the particular term.

13. The method of claim 1, wherein reformulating the original search query further comprises adding the particular term to the original search query.

14. The method of claim 1, wherein the demote control or the promote control comprises a checkbox, a button, or a hyperlink.

15. The method of claim 1, wherein determining a frequency with which a particular term occurs in the text associated with the one or more of the search results comprises determining that the particular term occurs more than a predetermined number of times in the search results, or is one of an N most frequently occurring terms in the search results, N being a positive integer.

16. A system comprising:
one or more computers and one or more storage devices storing instructions that are operable, when executed by the one or more computers, cause the one or more computers to perform operations comprising:
obtaining search results that are identified as responsive to an original search query;
determining a frequency with which a particular term occurs in text associated with one or more of the search results;
determining a frequency with which the particular term occurs in other text;
determining that the frequency with which the particular term occurs in the text associated with the one or more search results differs, by a threshold extent, from the frequency with which the particular term occurs in the other text;
in response to determining that the frequency with which the particular term occurs in a text associated with the one or more search results differs, by the threshold extent, from the frequency with which the term occurs in the other text, providing, for display, a representation of the particular term, a demote control to specify that the search results for the reformulated search query that include the particular term are to be demoted, and a promote control to specify that the search results for the formulated search query that include the particular term are to be promoted;
receiving data indicative of a selection of the demote control or the promote control; and
in response to receiving the data indicative of the selection of the demote control or the promote control, reformulating the original search query to promote or demote the particular term.

17. The system of claim 16, wherein determining a frequency with which a particular term occurs in the text associated with the one or more of the search results comprises determining the frequency of the particular term based on an occurrence count.

18. The system of claim 16, wherein determining a frequency with which a particular term occurs in the text associated with the one or more of the search results comprises determining the frequency of the particular term based on an occurrence count, and the particular term not being a stop word.

19. The system of claim 16, wherein determining a frequency with which a particular term occurs in the text associated with the one or more of the search results comprises determining that the particular term occurs in the text more than a predetermined quantity of times.

20. The system of claim 16, wherein determining a frequency with which a particular term occurs in the text associated with the one or more of the search results comprises determining that the particular term is one of an N most frequently occurring terms, N being a positive integer.

21. The system of claim 16, wherein the frequency with which a particular term occurs in the text associated with one or more of the search results is obtained by the search engine after executing the original search query.

22. A non-transitory computer storage medium encoded with a computer program, the program comprising instructions that when executed by data processing apparatus cause the data processing apparatus to perform operations comprising:
obtaining search results that are identified as responsive to an original search query;
determining a frequency with which a particular term occurs in text associated with one or more of the search results;
determining a frequency with which the particular term occurs in other text;
determining that the frequency with which the particular term occurs in the text associated with the one or more search results differs, by a threshold extent, from the frequency with which the particular term occurs in the other text;
in response to determining that the frequency with which the particular term occurs in a text associated with the one or more search results differs, by the threshold extent, from the frequency with which the term occurs in the other text, providing, for display, a representation of the particular term, a demote control to specify that the search results for the reformulated search query that include the particular term are to be demoted, and a promote control to specify that the search results for the formulated search query that include the particular term are to be promoted;

receiving data indicative of a selection of the demote control or the promote control; and in response to receiving the data indicative of the selection of the demote control or the promote control, reformulating the original search query to promote or demote the particular term.

* * * * *